United States Patent
Quinn

(10) Patent No.: US 10,058,882 B1
(45) Date of Patent: Aug. 28, 2018

(54) HIGH PRESSURE WATER/FOAM NOZZLE ASSEMBLY

(71) Applicant: Kevin J. Quinn, New London, WI (US)

(72) Inventor: Kevin J. Quinn, New London, WI (US)

(73) Assignee: Kevin J. Quinn, New London, WI (US)

( * ) Notice: Subject to any disclaimer, the term of this patent is extended or adjusted under 35 U.S.C. 154(b) by 0 days.

(21) Appl. No.: 15/789,457

(22) Filed: Oct. 20, 2017

(51) Int. Cl.
| | |
|---|---|
| *B05B 9/01* | (2006.01) |
| *B05B 1/12* | (2006.01) |
| *H04N 5/33* | (2006.01) |
| *A62C 31/03* | (2006.01) |
| *A62C 31/12* | (2006.01) |

(52) U.S. Cl.
CPC .............. *B05B 9/01* (2013.01); *A62C 31/03* (2013.01); *A62C 31/12* (2013.01); *B05B 1/12* (2013.01); *H04N 5/33* (2013.01)

(58) Field of Classification Search
CPC .......... B05B 9/01; B05B 1/12; B05B 1/1654; A62C 31/03; A62C 31/12; H04N 5/33
USPC .............. 239/390–392, 394, 526, 289, 442; 169/60, 70, 52
See application file for complete search history.

(56) References Cited

U.S. PATENT DOCUMENTS

| | | |
|---|---|---|
| 1,500,431 A | 7/1924 | Wolf |
| 2,482,502 A | 9/1949 | Orr |
| 2,514,313 A | 7/1950 | Davidson et al. |
| 2,746,369 A | 5/1956 | Beard et al. |
| 2,851,936 A | 9/1958 | Seiden |
| 2,894,709 A | 7/1959 | Alinari |
| 3,369,609 A | 2/1968 | Fogelgren |
| 4,082,148 A | 4/1978 | Willms |
| 5,386,940 A * | 2/1995 | Berfield ................ B05B 1/1654 239/394 |
| 6,431,465 B1 | 8/2002 | Yie |
| 2011/0284251 A1 | 11/2011 | Couvee et al. |
| 2012/0061109 A1 | 3/2012 | Pavesi |

(Continued)

FOREIGN PATENT DOCUMENTS

| | | |
|---|---|---|
| DE | 10 2008 025 325 A1 | 4/2009 |
| DE | 20 2015 002 738 U1 | 6/2015 |

(Continued)

*Primary Examiner* — Christopher Kim
(74) *Attorney, Agent, or Firm* — Thomas J. Connelly; Northwind IP Law, S.C.

(57) ABSTRACT

A high pressure water/foam nozzle assembly is disclosed which includes a barrel having a first end, a second end and a collar positioned about the first end. The assembly also includes first, second and third nozzles positioned in the barrel. Each of the nozzles can emit a different spray pattern. A selection mechanism is positioned adjacent to the second end of the barrel and is rotatable between three positions which align with the three nozzles. The assembly further includes a control mechanism secured to the second end of the selection mechanism which controls the flow of water and/or foam through one of the three nozzles. A handle and trigger are connected to the control mechanism. The trigger activates the flow of water and/or foam through one of the three nozzles. An infrared camera is removably secured to the control mechanism and is used to detect hot spots in a fire.

20 Claims, 4 Drawing Sheets

(56) References Cited

U.S. PATENT DOCUMENTS

| | | | |
|---|---|---|---|
| 2013/0303054 A1* | 11/2013 | Weigle, Jr. | ............... F41H 9/04 451/40 |
| 2015/0021412 A1* | 1/2015 | Gilpatrick | ................ B05B 1/34 239/310 |
| 2017/0080269 A1 | 3/2017 | Zaia | |

FOREIGN PATENT DOCUMENTS

| | | |
|---|---|---|
| FR | 3 036 455 | 11/2016 |
| JP | 2004-8268 A | 1/2004 |
| WO | WO 2006/079683 A1 | 8/2006 |

* cited by examiner

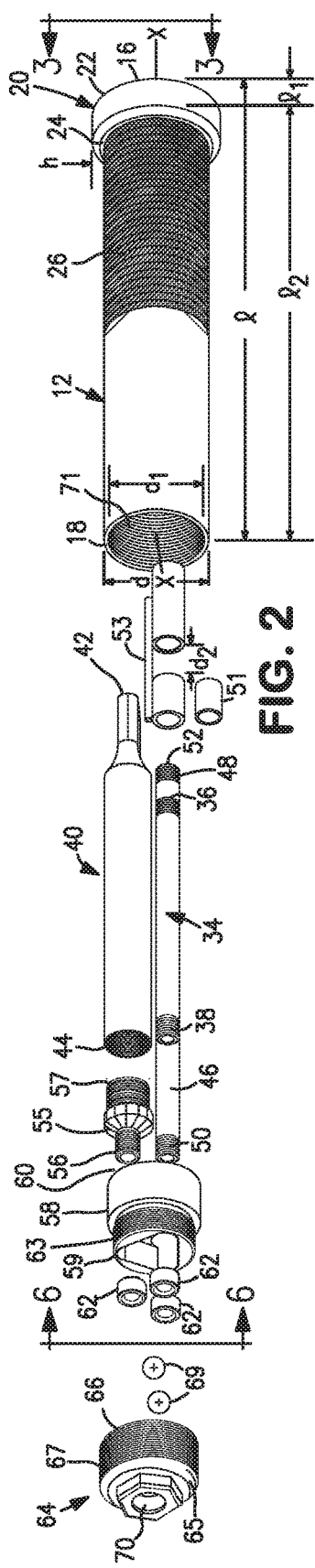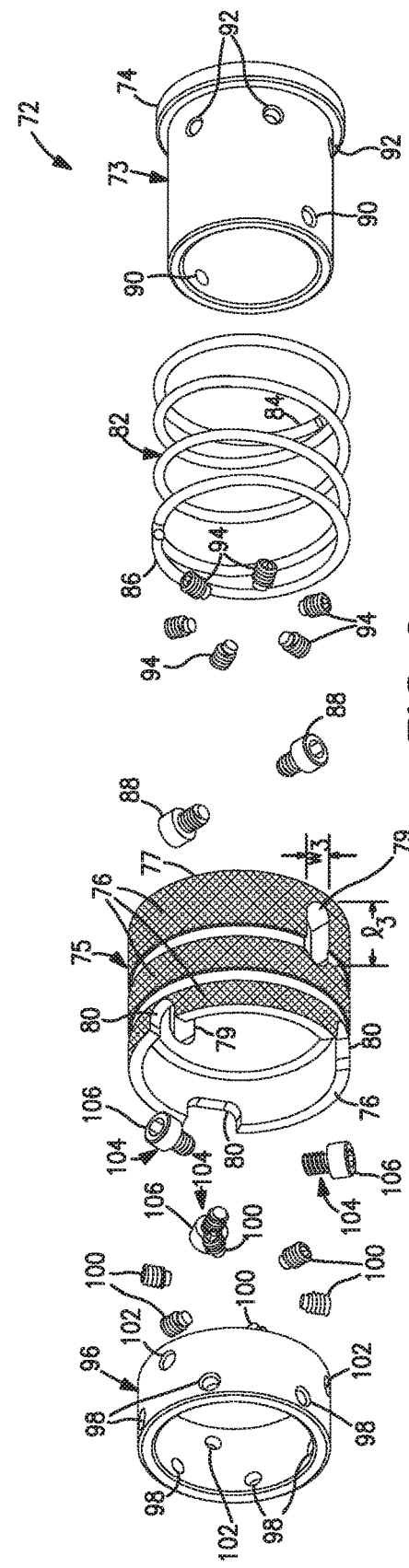

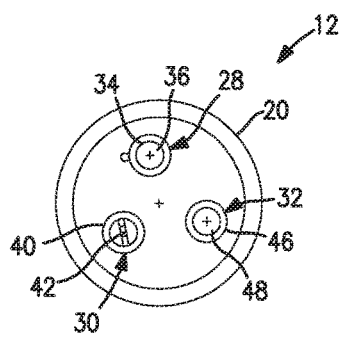
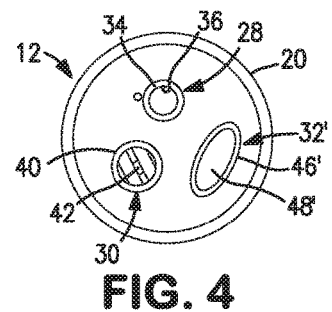
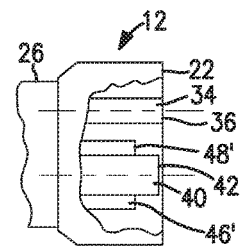
FIG. 3  FIG. 4  FIG. 5
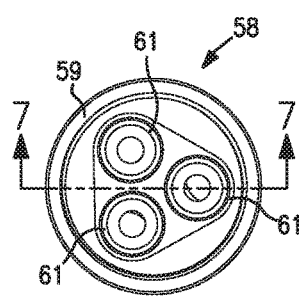
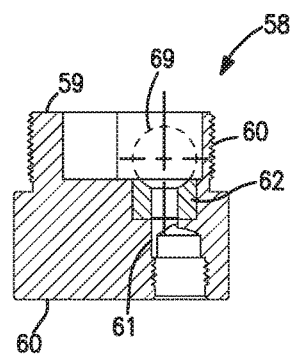
FIG. 6  FIG. 7
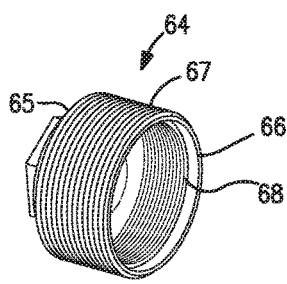
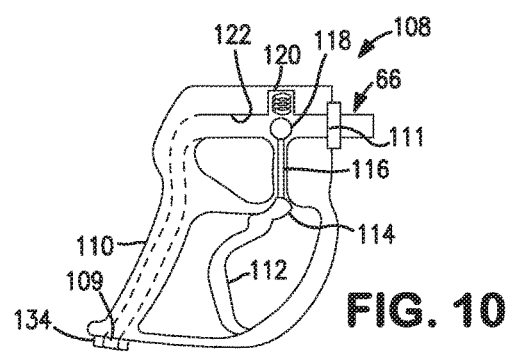
FIG. 8  FIG. 10

HIGH PRESSURE WATER/FOAM NOZZLE ASSEMBLY

FIELD OF THE INVENTION

This invention relates to a high pressure water/foam nozzle assembly used to fight fires.

BACKGROUND OF THE INVENTION

Fires can occur at any time and in almost any place. A fire often starts because of human error, accidents, arson, electrical failures or simply due to forces of nature. A raging fire in a residential, commercial, industrial, or farm building can be extremely dangerous and can result in severe property damage. Injury or death can also occur to humans, pets and farm animals. The longer a fire burns, the bigger the fire grows and the more difficult it becomes to extinguish the inferno. Because it typically takes a fire department several minutes to respond to a fire call, the fire has a chance to grow exponentially until the fire fighters arrive to combat the flames.

Conventionally, fire fighters have used water hoses to battle a burning fire. The water is usually withdrawn from a fire hydrant, a pumper truck or a nearby body of water. A large diameter fire hose is connected to the fire hydrant, to an outlet formed on a pumper truck, or to a low pressure pump connected to the body of water. The water is routed to an adjustable nozzle located on the opposite end of the fire hose. The fire fighters manually hold the nozzle and direct the stream of water onto the burning fire. The water is usually dispensed from the nozzle at a relatively low pressure. The firefighters are trained to extinguish the fire by smothering it with large quantities of water to deprive it of the oxygen necessary for combustion.

This method of fighting fires is not always the most useful especially when the fire involves burning chemicals which may explode when contacted by water. Furthermore, in many instances, it may be difficult to deliver the water to the upper floors of a tall building. Still further, some fires occur were an abundance of water is not available.

Now, a high pressure water/foam nozzle assembly has been invented which is extremely useful in fighting fires.

SUMMARY OF THE INVENTION

Briefly, this invention relates to a high pressure water/foam nozzle assembly used to fight fires. The high pressure water/foam nozzle assembly includes a hollow elongated barrel having a longitudinal central axis. The barrel has an external surface with a first end and a second end. A collar is positioned about the first end which protrudes outward from the external surface. The nozzle assembly also includes a first nozzle, a second nozzle and a third nozzle. The three nozzles are radially aligned around the longitudinal central axis of the barrel. Each of the first, second and third nozzles can emit a different spray pattern. The nozzle assembly further includes a selection mechanism secured to the second end of the barrel. The selection mechanism is rotatable between a first position, a second position, and a third position. The first position is aligned with the first nozzle, the second position is aligned with the second nozzle, and the third position is aligned with the third nozzle. The selection mechanism also includes a locking collar for preventing the selection mechanism from inadvertently rotating. The nozzle assembly also includes a control mechanism secured to the second end of the barrel. The control mechanism controls the flow of high pressure water and/or foam through one of the first, second or third nozzles. The nozzle assembly further includes a handle secured to the control mechanism and a trigger mounted on the handle. The trigger is connected to the control mechanism and can activate the flow of high pressure water and/or foam through one of the first, second or third nozzles. Lastly, the nozzle assembly includes an infrared camera removably secured to the handle and aligned parallel to the longitudinal axis of the barrel for detecting hot spots in a fire.

In another embodiment, the high pressure water/foam nozzle assembly includes a hollow elongated barrel having a longitudinal central axis. The barrel has an external surface with a first end and a second end. A collar is positioned about the first end which protrudes outward from the external surface. The external surface has a knurled portion formed thereon which extends rearward from the collar. The nozzle assembly also includes a first nozzle, a second nozzle and a third nozzle. The three nozzles are radially aligned around the longitudinal central axis of the barrel. Each of the first, second and third nozzles can emit a different spray pattern. The nozzle assembly further includes a selection mechanism secured to the second end of the barrel. The selection mechanism is rotatable between a first position, a second position, and a third position. The first position is aligned with the first nozzle, the second position is aligned with the second nozzle, and the third position is aligned with the third nozzle. The selection mechanism also includes a locking collar for preventing the selection mechanism from inadvertently rotating. The nozzle assembly also includes a control mechanism secured to the second end of the barrel. The control mechanism controls the flow of high pressure water and/or foam through one of the first, second or third nozzles. The nozzle assembly further includes a handle secured to the control mechanism and a trigger mounted on the handle. The trigger is connected to the control mechanism and can activate the flow of high pressure water and/or foam through one of the first, second or third nozzles. The nozzle assembly also includes a mount secured to the handle. Lastly, the nozzle assembly includes an infrared camera removably secured to the mount and aligned parallel to the longitudinal axis of the barrel for detecting hot spots in a fire.

In a third embodiment, the high pressure water/foam nozzle assembly includes a hollow elongated barrel having a longitudinal central axis. The barrel has an external surface with a first end and a second end. A collar is positioned about the first end which protrudes outward from the external surface. The external surface has a knurled portion formed thereon which extends rearward from the collar. The nozzle assembly also includes a first nozzle, a second nozzle and a third nozzle. The three nozzles are radially aligned around the longitudinal central axis of the barrel. Each of the first, second and third nozzles can emit a different spray pattern. The nozzle assembly further includes a selection mechanism secured to the second end of the barrel. The selection mechanism is rotatable between a first position, a second position, and a third position. The first position is aligned with the first nozzle, the second position is aligned with the second nozzle, and the third position is aligned with the third nozzle. The selection mechanism also includes a locking collar for preventing the selection mechanism from inadvertently rotating. The nozzle assembly also includes a control mechanism secured to the second end of the barrel. The control mechanism controls the flow of high pressure water and/or foam through one of the first, second or third nozzles. The nozzle assembly further includes a handle secured to the control mechanism and a trigger mounted on the handle. The trigger is connected to the control mechanism and can activate the flow of high pressure water and/or foam through one of the first, second or third nozzles. The nozzle assembly also includes a mount secured to the handle. The mount has a top surface. A first bracket is secured to the top surface of the mount. Lastly, the nozzle assembly includes an infrared camera removably secured to the first bracket and aligned parallel to the longitudinal axis of the barrel for detecting hot spots in a fire.

The general object of this invention is to provide a high pressure water/foam nozzle assembly used to fight fires. A more specific object of this invention is to provide a high pressure water/foam nozzle assembly which uses considerably less water.

Another object of this invention is to provide a high pressure water/foam nozzle assembly which is connected to a light weight pressure hose, is easy to maneuver, exhibits less nozzle recoil, and is compatible with Class A, B or ATC (AR)/AFFF foams.

A further object of this invention is to provide a high pressure water/foam nozzle assembly which can handle flow rates ranging from between about 6 gallons per minute to about 20 gallons per minute, and at a pressure ranging from between about 1,500 psi. to about 3,000 psi.

Still another object of this invention is to provide a high pressure water/foam nozzle assembly which can emit different spray patterns or water and/or foam.

Still further, an object of this invention is to provide a high pressure water/foam nozzle assembly which utilizes an infrared camera to identify hot spots in a fire.

Other objects and advantages of the present invention will become more apparent to those skilled in the art in view of the following description and the accompanying drawings.

BRIEF DESCRIPTION OF THE DRAWINGS

FIG. 2 is an exploded view of the hollow elongated barrel and the first, second, and third nozzles retained in the barrel.

FIG. 3 is an end view of the barrel taken along line 3-3 of FIG. 1.

FIG. 4 is an end view of an alternative embodiment of the barrel showing the third nozzle having a non-circular cross-section.

FIG. 5 is a partial cut away view of the first end of the barrel 12 shown in FIG. 4.

FIG. 6 is an end view of a first connector having three seals secured therein.

FIG. 7 is a cross-sectional view of the first connector taken along line 7-7.

FIG. 8 is a perspective view of the second fitting.

FIG. 9 is an exploded view of the selection mechanism used in the high pressure water/foam nozzle assembly.

FIG. 10 is a partial cutaway side view of a control mechanism.

DETAILED DESCRIPTION OF THE INVENTION

Figure 1:
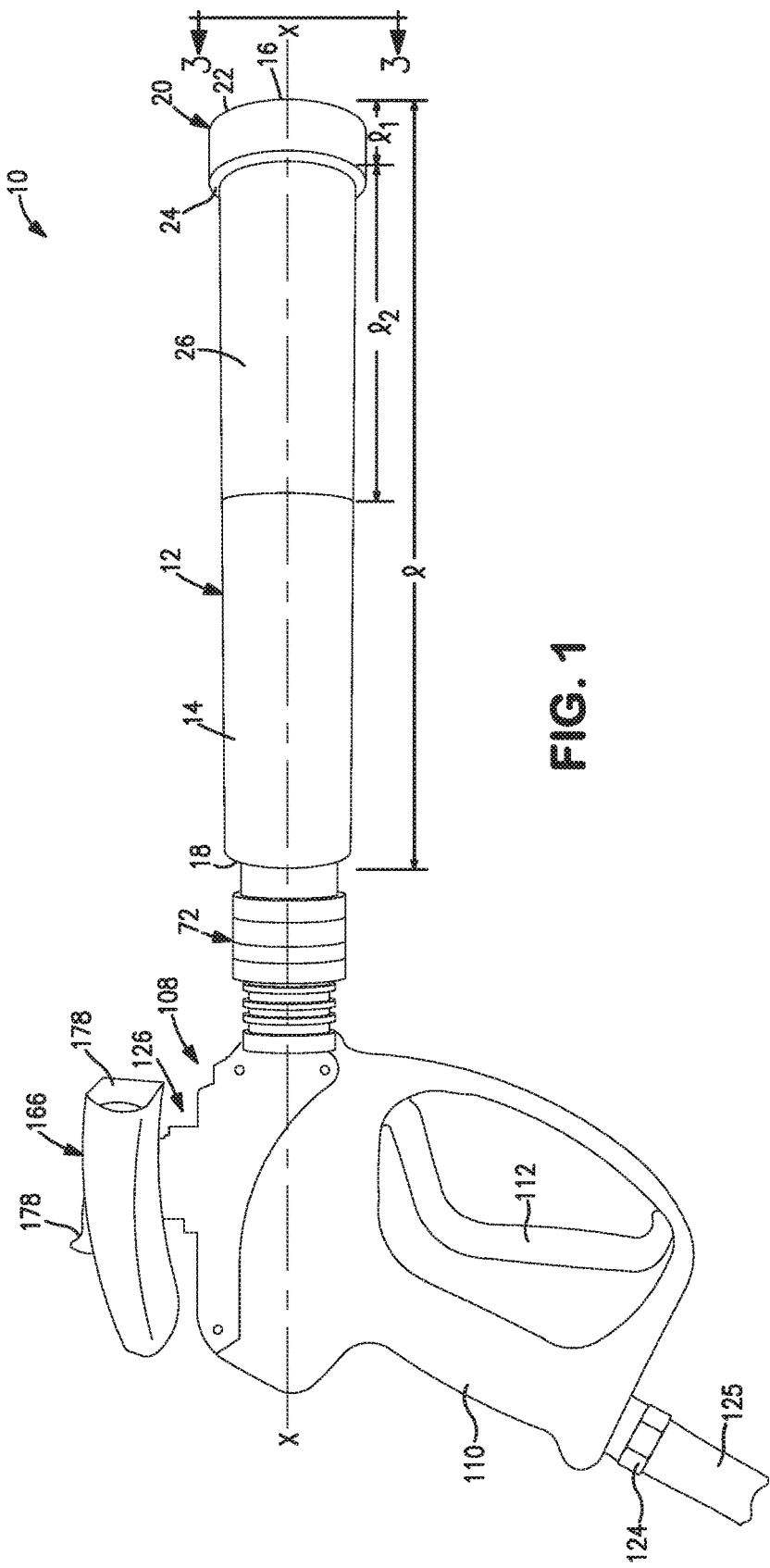
FIG. 1 is a side view of a high pressure water/foam nozzle assembly connected to a pressure hose.

Referring to FIGS. 1 and 2, a high pressure water/foam nozzle assembly 10 is shown which can be used to fight fires. The high pressure water/foam nozzle assembly 10 includes a hollow elongated barrel 12 having a longitudinal central axis X-X. By "barrel" it is meant a hollow cylindrical member. The barrel 12 can be formed from various materials. Desirably, the barrel 12 is constructed of stainless steel since the high pressure water/foam nozzle assembly 10 is used in a wet environment. The hollow elongated barrel 12 is a cylindrical member having a length l, an outside diameter d, and an inside diameter $d_1$, see FIG. 2. The length l, and the outside and the inside diameters, d and $d_1$ respectively, can vary. Generally, the barrel 12 has a length l of at least 10 inches. Desirably, the barrel 12 has a length l ranging from between about 10 inches to about 20 inches. More desirably, the barrel 12 has a length l ranging from between about 12 inches to about 15 inches. Even more desirably, the barrel 12 has a length l of less than about 14 inches. Most desirably, the barrel 12 has a length l of about 12 inches.

Referring to FIG. 2, the outside diameter d of the hollow elongated barrel 12 can range from between about 1 inch to about 4 inches. Desirably, the outside diameter d of the barrel 12 can range from between about 1.5 inches to about 3 inches. More desirably, the outside diameter d of the barrel 12 can range from between about 1.75 inches to about 2.75 inches. Even more desirably, the outside diameter d of the barrel 12 can range from between about 2 inches to about 2.5 inches. Most desirably, the outside diameter d of the barrel 12 is about 2.5 inches.

The inside diameter $d_1$ of the hollow elongated barrel 12 can range from between about 0.2 inches to about 0.5 inches less than the outside diameter d. This means that the wall thickness of the barrel 12 can range from between about 0.1 inches to about 0.25 inches. Desirably, the inside diameter $d_1$ of the barrel 12 is about 0.45 inches less than the outside diameter d. More desirably, the inside diameter $d_1$ of the barrel 12 is about 0.4 inches less than the outside diameter d. Even more desirably, the inside diameter $d_1$ of the barrel 12 is about 0.35 inches less than the outside diameter d. Most desirably, the inside diameter $d_1$ of the barrel 12 is about 0.3 inches less than the outside diameter d.

Still referring to FIG. 2, the hollow elongated barrel 12 has an external surface 14 with a first end 16 and a second end 18. A collar 20 is positioned on or about the first end 16. By "collar" it is meant an encircling structure. The collar 20 can be integrally formed with the barrel 12, if desired. By "integral" it is meant essential or necessary for completeness; a complete unit. The collar 20 can be formed of the same material that was used to construct the barrel 12 or it can be formed from a different material. Desirably, the collar 20 is formed from stainless steel. The collar 20 protrudes outward from the external surface 14 of the barrel 12. The collar 20 has a first end 22, a second end 24, a length $l_1$ and a height h. The length $l_1$ is measured parallel to the longitudinal central axis X-X of the elongated barrel 12. The height h is measured perpendicular from the external surface 14 of the elongated barrel 12. The first end 22 of the collar 20 is shown being coextensive with the first end 16 of the barrel 12. By "coextensive" it is meant having the same limits, boundaries, or scope. Alternatively, the first end 22 of the collar 20 could extend outward beyond the first end 16 of the elongated barrel 12.

The length $l_1$ and the height h of the collar 20 can vary. The length $l_1$ of the collar 20 can range from between about 0.5 inches to about 1.5 inches. Desirably, the length $l_1$ of the collar 20 is about 1 inch. The height h of the collar 20 is measured perpendicularly outward from the external surface 14 of the hollow elongated barrel 12. The height h of the collar 20 is at least about 0.15 inches. Desirably, the height h of the collar 20 is at least about 0.18 inches. More desirably, the height h of the collar 20 is at least about 0.2 inches. Even more desirably, the height h of the collar 20 is at least about 0.25 inches or more. The collar 20 serves as a stop to prevent a person's (fire fighter's) hand from sliding off of the hollow elongated barrel 12. This is important, especially with the fire fighter is wearing heavy gloves.

Referring again to FIGS. 1 and 2, the external surface 14 of the barrel 12 has a knurled portion 26 formed thereon which extends rearward from the collar 20. By "knurled" it is meant one of a series of small ridges or grooves on the surface of a metal object to aid in gripping. The knurled portion 26 has a length $l_2$ which can vary. The length $l_2$ of the knurled portion 26 should be of sufficient dimension to allow a person (fire fighter) to grasp the barrel 12 with one hand and point the barrel 12 in a desired direction. For example, a right handed fire fighter would place his left hand on the knurled portion of the barrel 12. The length $l_2$ of the knurled portion 26 should be at least about 3 inches. Desirably, the length $l_2$ of the knurled portion 26 should be at least about 4 inches. More desirably, the length $l_2$ of the knurled portion 26 should be at least about 4.5 inches. Even more desirably, the length $l_2$ of the knurled portion 26 should be at least about 5 inches. Most desirably, the length $l_2$ of the knurled portion 26 should be greater than about 4.75 inches.

Referring now to FIGS. 2 and 3, the high pressure water/foam nozzle assembly 10 also includes a first nozzle 28, a second nozzle 30 and a third nozzle 32. By "nozzle" it is meant a projecting part with an opening, as at the end of a hose, for regulating and directing a flow of a fluid. All three nozzles, 28, 30 and 32 are aligned radially around the longitudinal central axis X-X of the elongated barrel 12. By "radial" it is meant of, relating to, or arranged like rays or radii. Each of the first, second and third nozzles, 28, 30 and 32 respectively, can emit a different spray pattern. By "spray pattern" it is meant a particular configuration or form. Each of the first, second and third nozzles, 28, 30 and 32 respectively, can emit water, a liquid, a chemical, a foam, or a combination of water, a liquid, a chemical and foam. The spray can consist of a mass of dispersed droplets moving in an outward direction.

The first nozzle 28 includes a first tube 34 having a first opening 36 and a second opening 38, the second nozzle 30 includes a second tube 40 having a first opening 42 and a second opening 44, and the third nozzle 32 includes a third tube 46 having a first opening 48 and a second opening 50. Each of the first, second and third nozzles, 28, 30 and 32 respectively, is depicted as having a circular profile. Likewise, each of the first, second and third tubes, 34, 40 and 46 respectively, has a circular profile. The diameter of each of the first, second and third nozzles, 28, 30 and 32 respectively, can vary. Generally, at least one of the first, second and third nozzles, 28, 30 and 32 respectively, will have a different diameter from at least one of the other first, second and third nozzles, 28, 30 and 32 respectively. Likewise, the diameter of each of the first, second and third tubes, 34, 40 and 46 respectively, can vary. Generally, at least one of the first, second and third tubes, 34, 40 and 46 respectively, will have a different diameter from at least one of the other first, second and third tubes, 34, 40 and 46 respectively.

Referring now to FIGS. 4 and 5, an alternative embodiment is depicted which shows a first nozzle 28, a second nozzle 30 and a third nozzle 32'. In this embodiment, the first and second nozzles, 28 and 30 respectively, have a circular profile while the third nozzle 32' has a non-circular profile. The third nozzle 32' includes a third tube 46' and has a first opening 48' formed adjacent to the first end 16 of the barrel 12. The third nozzle 32' is shown having an oval shaped profile. Likewise, the third tube 46' would have an oval shaped profile. However, any geometrical shape could be utilized which produced a desired shaped stream. The profile of the first, second and third nozzles, 28, 30 and 32 respectively, as well as the profile of the first, second and third tubes, 34, 40 and 46' respectively, could be changed to meet one's particular needs.

It should be understood that the diameter and/or cross-section of each of the first, second and third tubes, 34, 40 and 46 or 46' respectively, can change over the length of each tube 34, 40 and 46 or 46'. In other words, a tube can start off having a circular diameter and then can taper down to a smaller diameter or expand to a larger diameter. Also, a tube could start off with a circular diameter that changes shape to a non-circular profile or vice versa, if desired.

Referring now to FIG. 5, the first opening 36 of the first nozzle 28 is aligned flush with the first end 16 of the hollow elongated barrel 12. The first opening 42 of the second nozzle 30 is spaced slightly inward from the first end 16 of the hollow elongated barrel 12. The first opening 48 of the third nozzle 32 is spaced inward from the first end 16 of the hollow elongated barrel 12. The first opening 48 in the third tube 46 is spaced farther away from the first end 16 of the hollow elongated barrel 12 then is the first opening 42 of the second tube 40. Variations to such an arrangement can be made depending on the type of spray pattern required.

Each of the first, second and third nozzles, 28, 30 and 32 or 32' should be designed and constructed to handle a fluid flow rate ranging from between about 5 gallons per minute (GPM) to about 25 GPM. Desirably, each of the first, second and third nozzles, 28, 30 and 32 or 32' should be designed and constructed to handle a fluid flow rate ranging from between about 6 GPM to about 20 GPM. More desirably, each of the first, second and third nozzles, 28, 30 and 32 or 32' should be designed and constructed to handle a fluid flow rate of at least about 7 GPM. Even more desirably, each of the first, second and third nozzles, 28, 30 and 32 or 32' should be designed and constructed to handle a fluid flow rate of at least about 8 GPM. Most desirably, each of the first, second and third nozzles, 28, 30 and 32 or 32' should be designed and constructed to handle a fluid flow rate of at least about 9 GPM.

Each of the first, second and third nozzles, 28, 30 and 32 or 32' respectively, are designed to discharge or dispense water, a liquid, a chemical, a foam or a combination of water, or a liquid, or a chemical and a foam. The water, or a liquid, or a chemical and/or foam can be dispensed from each of the first, second or third nozzles, 28, 30 and 32 or 32' respectively. The first, second and third nozzles, 28, 30 and 32 or 32' respectively, can be manufactured to dispense water, a liquid, a chemical, a foam, or a combination of water, or a liquid, or a chemical and a foam at any desired fluid flow rate. Typical fluid flow rates were mentioned above. It should be understood that each of the first, second or third nozzles, 28, 30 and 32 or 32' respectively, can be manufactured and set at the factory to dispense water, a liquid, a chemical, a foam, or a combination of water, or a liquid, or a chemical and a foam at a predetermined fluid flow rate. Common flow rates are 6 GPM, 8 GPM, 10 GPM, 16 GPM or 20 GPM. However, the manufacturer can select any flow rate between 5 GPM and 25 GPM. The manufacturer could also go below 5 GPM or above 25 GPM, if needed, for a particular application.

Each of the first, second and third nozzles, 28, 30 and 32 or 32' respectively, are designed to discharge or dispense water, a liquid, a chemical, a foam, or a combination of water, or a liquid, or a chemical and a foam at a pressure ranging from between about 1,500 psi. to about 3,000 psi. This range of pressure values is sometimes referred to as: "high pressure" or "ultra high pressure". These pressure values are well above conventional low pressure systems where a fire hose is connected to a fire hydrant. Desirably, each of the first, second and third nozzles, 28, 30 and 32 or 32' respectively, is designed to discharge or dispense water, a liquid, a chemical, a foam, or a combination of water, or a liquid, or a chemical and a foam at a pressure ranging from between about 1,600 psi. to about 2,900 psi. More desirably, each of the first, second and third nozzles, 28, 30 and 32 or 32' respectively, is designed to discharge or dispense water, a liquid, a chemical, a foam, or a combination of water, or a liquid, or a chemical and a foam at a pressure ranging from between about 1,700 psi. to about 2,800 psi. Even more desirably, each of the first, second and third nozzles, 28, 30 and 32 or 32' respectively, is designed to discharge or dispense water, a liquid, a chemical, a foam, or a combination of water, or a liquid, or a chemical and a foam at a pressure of at least about 1,750 psi. Most desirably, each of the first, second and third nozzles, 28, 30 and 32 or 32' respectively, is designed to discharge or dispense water, a liquid, a chemical, a foam, or a combination of water, or a liquid, or a chemical and a foam at a pressure of at least about 1,800 psi.

It should be understood that each of the first, second and third nozzles, 28, 30 and 32 or 32' respectively, can dispense a foam which is combined with water, or a liquid, or a chemical to produce what is known in the industry as a "wet foam". The consistency of the "wet foam" can vary. The "wet foam" can have a consistency ranging from something like skin milk (mostly water) to the consistency of shaving cream. The foam can be aerated to produce a shaving cream consistency which has the ability to cling to a vertical wall or a ceiling and thereby smother or suffocate a fire.

Referring again to FIG. 2, a first connector 51 is threaded onto the first opening 36 of the first tube 34. The first connector 51 is hollow and functions to control the spray pattern emanating from the first tube 34. For example, the first connector 51 could produce a wide spray pattern. A second connector 52 is threaded onto the first opening 48 of the third tube 46. The second connector 52 is also hollow. The second connector 52 is attached by a rod 53 and a pipe 54. For example, the rod 53 can be welded to both the second connector 52 and the pipe 54. The rod 53 allows the pipe 54 to be spaced from the second connector 52 by a predetermined distance $d_2$. The distance $d_2$ can range from between about 0.1 inches to about 1 inch. Desirably, the distance $d_2$ ranges from between about 0.2 inches to about 0.8 inches. More desirably, the distance $d_2$ ranges from between about 0.25 inches to about 0.75 inches. Even more desirably, the distance $d_2$ ranges from between about 0.3 inches to about 0.6 inches. Most desirably, the distance $d_2$ is about 0.5 inches. The combination of the second connector 52, the rod 53, and the pipe 54 function to produce a stream pattern. The distance $d_2$ located between the second connector 52 and the pipe 54 enables a stream pattern to be obtained.

Still referring to FIG. 2, the second tube 40 has a uniquely shaped first end 42 which functions to produce a third spray pattern. Therefore, the high pressure water/foam nozzle assembly 10 can produce three different spray or stream patterns.

In FIG. 2, one will notice a fitting 55 having a first opening 56 and a second opening 57. The fitting 55 is threaded onto the second opening 44 of the second tube 40. The fitting 55 is hollow. The fitting 55 is optional and can be used when the diameter of one of the second openings, 38, 44 and 50 differ in size from the remaining second openings, 38, 44 or 50. As depicted, the second opening 44 of the second tube 40 is larger than the second openings, 38 and 50, of the first and third tubes, 34 and 46 respectively. It is advantageous that all three of the second openings, 38, 44 and 50 be of the same diameter for assembly purposes.

Referring now to FIGS. 2, 6 and 7, a first fitting 58 is shown having a first end 59 and a second end 60. The first fitting 58 can be formed from different materials. Desirably, the first fitting 58 is made from stainless steel. The first fitting 58 contains three internal bores 61, 61 and 61, see FIG. 6, each of which extends completely through the first fitting 58 from the first end 59 to the second end 60. The diameter of each bore 61, 61 and 61 can vary over its length, see FIG. 7. Alternatively, each bore 61, 61 and 61 could be machined to have a single diameter.

Referring to FIGS. 2 and 7, a seal 62 is press fitted into each of the three bores 61, 61 and 61. Each of the three seals 62, 62 and 62 is designed to prevent fluid leakage through each of the bores 61, 61 and 61. Desirably, each of the three seals 62, 62 and 62 is of the same diameter. This saves on cost and reduces the need to keep different diameter seals 62 in stock.

The three seals 62, 62 and 62 can be identical in size and construction to one another. The three seals 62, 62 and 62 can be formed from various materials known to those skilled in the art. The three seals 62, 62 and 62 must be designed to prevent fluid leakage under high pressure. By "high pressure" it is meant a pressure ranging from between about 1,500 psi. to about 3,000 psi.

An ultra-slippery plastic or thermoplastic seal 62 work well. A plastic known as Acetal is a polyacetal. An acetal is a molecule with two single bonded oxygens attached to the same carbon atom. Seals 62 made from materials that exhibit a degree of flexibility in order to tightly fill the space between two or more surfaces is desirable. Acetal is a durable and tough material that can be used to construct the seals 62, 62 and 62. This material allows the three seals 62, 62 and 62 to withstand high compressive loads while resisting damage from most chemical and solvents. Piedmont Plastics, having an office at 2800 South 166$^{th}$ Street, New Berlin, Wis. 53151 is one company that specializes in supplying high-performance materials suitable for the manufacture of quality seals.

Each of the three seals 62, 62 and 62 can be pressed fitted or be secured by another means into one of the three bores 61, 61 and 61 formed in the first fitting 58. Each of the three seals 62, 62 and 62 can be machined to a close tolerance, if needed. The three seals 62, 62 and 62 are designed to prevent fluid leakage under the high pressure values recited above. The three seals 62, 62 and 62 are important in preventing fluid leakage of water, a liquid, a chemical and/or a foam.

Referring now to FIGS. 2, 7 and 8, the first fitting 58 has a threaded external surface 63. A second fitting 64 having a first end 65, a second end 66, a threaded external surface 67, and a threaded internal surface 68 is designed to mate with the first fitting 58. The threaded external surface 63 of the first fitting 58 is sized to mate with the threaded internal surface 68 of the second fitting 64.

Referring again to FIGS. 2 and 7, two spherical balls 69, 69 are shown. Each ball 69, 69 is sized and configured to mate with one of the three seals 62, 62 and 62 and block off fluid flow through two of the three bores 61, 61 and 61. Since there are three bores 61, 61 and 61 and only two balls 69, 69, this means that fluid flow will always be possible through one of the three bores 61, 61 and 61. The balls 69, 69 operate on gravity to block off the lower two of the three bores 61, 61 and 61. This means that as the hollow elongated barrel 12 is rotated, either clockwise or counter clockwise, the upper most bore 61 will be open to fluid flow while the lower two bores 61 and 61 will be blocked off from fluid flow. By rotating the hollow elongated barrel 12, one can dictate which spray pattern will be made available to fight a fire.

Referring again to FIG. 2, one can clearly see that an opening 70 is formed through the first end 65 of the second fitting 64. A conduit (not shown) can pass through this opening 70 and route pressurized water, a liquid, a chemical and/or a foam through the second fitting 64 and through the open bore 61.

Referring again to FIGS. 2 and 7, each of the second openings 38, 50 and 56 of the first tube 34, the third tube 46 or 46', and the fitting 55 respectively, can be threaded into one of the three bores 61, 61 and 61, see FIG. 7. In addition, the threaded external surface 68 of the second fitting 64 can be threaded into a threaded internal surface 71 formed in the hollow elongated barrel 12. The threaded internal surface 71 is adjacent to the second end 18 of the hollow elongated barrel 12. By these attachments, the first, second and third tubes, 34, 40 and 46 or 46' will be held stationary within the hollow elongated barrel 12.

It should be understood that the first, second and third tubes, 34, 40 and 46 or 46' respectively, can still rotate in either the clockwise or counter clockwise direction. The method of rotating the first, second and third tubes 34, 40 and 46 or 46' respectively, will be explained below.

Referring again to FIGS. 1 and 2, the high pressure water/foam nozzle assembly 10 can produce three separate and distinct spray patterns. If a fourth nozzle (not shown) was positioned within the elongated barrel 12, a fourth spray pattern could be obtained. The at least three different spray patterns can include: a straight stream of water or wet foam, a conical stream of water or wet foam, and a highly aspirated stream of water or foam. By "wet foam" it is meant a mixture of water and foam. When the foam is highly aspirated it can acquire the consistency of shaving cream.

Each of the first, second and third nozzles, 28, 30, 32 or 32' respectively, can emit high pressure water and/or foam droplets. The water and/or foam droplets can have a length of at least about 40 μm. By "μm" it is meant a micrometer which is a unit of length equal to one thousandth ($10^{-3}$) of a millimeter or one millionth ($10^{-6}$) of a meter. Desirably, the water and/or foam droplets can have a length of at least about 50 μm. More desirably, the water and/or foam droplets can have a length of at least about 75 μm. Even more desirably, the water and/or foam droplets can have a length of at least about 90 μm. Most desirably, the water and/or foam droplets can have a length of at least about 100 μm.

The high pressure water/foam nozzle assembly 10 can handle different kinds of foam used to fight various kinds of fires. Class A foam is used to fight Class A fires and Class B foam is used to fight Class B fires. Class A foams attract carbon and Class B foams repel carbon. As a carbon-loving solution, Class A foam soaks into solid, combustible materials by breaking down the surface tension of the water. This helps the water penetrate the burning material to quickly suppress the fire and prevent rekindles. Class B foam, on the other hand, repels carbon. When mixed with water, it forms a film that hovers over a spill or burning liquid, sealing the flammable vapors. In the case of a chemical or oil spill, the Class B foam blankets the spill and prevents vapor production and ignition, or, in the case of a fire, suppresses the blaze and prevents it from spreading or reigniting. Industrial fires, tanker truck collisions and railcar accidents typically require Class B foam.

Class AR/AFFF is another kind of fire fighting foam. This foam is a versatile fire fighting foam for protection of a wide range of Class B flammable liquid hazards. U. S. Foam 0.5%-6% AR/AFFF is an all synthetic film forming foam designed for protection of water-soluble polar solvents, as well as water insoluble hydrocarbon flammable liquids. When used with fresh water and foam generating equipment, the Class AR/AFFF foam is transformed into a vapor blanketing foam to provide extinguishing and securing abilities.

It should be understood that other fire fighting foams known to those skilled in fire fighting can also be discharged through the high pressure water/foam nozzle assembly 10.

Referring now to FIG. 9, the high pressure water/foam nozzle assembly 10 also includes a selection mechanism 72 positioned adjacent to the second end 18 of the elongated barrel 12. The selection mechanism 72 includes a first collar 73 having an outward extending flange 74. The first collar 73 is hollow and is open at both ends. The first collar 73 can be formed from various materials. Desirably, the first collar 73 is formed from stainless steel.

The selection mechanism 72 also includes a locking collar 75 having a first end 76 and a second end 77. The locking collar 75 is also hollow. The locking collar 75 can be formed from various materials. Desirably, the locking collar 75 is formed from stainless steel. The locking collar 75 is sized to axially slide on a portion of the first collar 73. At least a portion of the outer circumference of the locking collar 75 can be knurled 78 to assist a person in gripping and moving the locking collar 75. As depicted, three spaced apart, circumferential portions of the locking collar 75 are knurled 78.

Still referring to FIG. 9, the locking collar 75 also has at least one axial slot 79 formed between the first and second ends, 76 and 77 respectively. A pair of axial slots 79, 79 is shown in FIG. 9. The pair of axial slots 79, 79 is positioned 180° apart on the circumference of the locking collar 75. Alternatively, the pair of axial slots 79, 79 can be offset from one another by an angle of from between about 30° to about 150°.

Each of the axial slots 79, 79 has a length $l_3$ and a width $w_3$. The length $l_3$ of each of the axial slots 79, 79 can vary in dimension. Desirably, the length $l_3$ of each of the axial slots 79, 79 is at least about 0.5 inches. More desirably, the length $l_3$ of each of the axial slots 79, 79 is at least about 0.55 inches. Even more desirably, the length $l_3$ of each of the axial slots 79, 79 is at least about 0.6 inches. Most desirably, the length $l_3$ of each of the axial slots 78, 78 is at least about 0.65 inches. The width $w_3$ of each of the axial slots 78, 78 can also vary in dimension. Desirably, the width $w_3$ of each of the axial slots 79, 79 is at least about 0.1 inches. More desirably, the width $w_3$ of each of the axial slots 79, 79 is at least about 0.15 inches. Even more desirably, the width $w_3$ of each of the axial slots 79, 79 is at least about 0.2 inches. Most desirably, the width $w_3$ of each of the axial slots 79, 79 is at least about 0.25 inches. When a pair of axial slots 79, 79 is utilized, each of the pair of axial slots 79, 79 can be identical in size and configuration.

The locking collar 70 further has three spaced apart recesses 80, 80 and 80, each of which opens at the first end 76. Each of the three recesses 80, 80 and 80 can have a generally U-shaped configuration. Alternatively, each of the three recesses 80, 80 and 80 can have some other desired configuration. A coil spring 82 is positioned on the first collar 73. The coil spring 82 has a first end 84 which contacts the flange 74 of the first collar 73 and a second end 86 which contacts the second end 77 of the locking collar 75. The coil spring 82 biases the locking collar 75 away from the flange 74. A screw 88 is threaded into an aperture 90 formed in the circumference of the first collar 73. The aperture 90 is located away from the flange 74. A pair of screws 88, 88 is shown in FIG. 9. Each of the pair of screws 88, 88 is spaced 180° apart and each is arranged such that it will engage with one of the pair of axial slots 79, 79. When a single axial slot 79 and a single screw 88 are utilized, the single screw 88 will engage with the axial slot 79. The screw 88 is sized and shaped to engage with the axial slot 79 formed in the locking collar 75 and prevent the locking collar 75 from rotating. The pair of screws 88, 88 performs the same function when they engage the pair of axial slots 79, 79.

Still referring to FIG. 9, the first collar 73 further has a number of threaded apertures 92 positioned about its circumference. The threaded apertures 92 extend through the first collar 73. Six threaded apertures 92, 92, 92, 92, 92 and 92 are depicted in FIG. 9, of which three of the threaded apertures 92, 92 and 92 are visible. Even though six threaded apertures 92, 92, 92, 92, 92 and 92 are taught, any desired number of threaded apertures 92 can be used. Desirably, at least two threaded apertures 92, 92, located 180° apart, are utilized to ensure a firm attachment. The six threaded apertures 92, 92, 92, 92, 92 and 92 are equally spaced 60° apart. A machine screw 96 is designed to be threaded into each of the six threaded apertures 94, 94, 94, 94, 94 and 94 and will function to secure the first collar 73 to another part of the high pressure water/foam nozzle assembly 10. This securement will be described in more detail below.

Still referring to FIG. 9, the selection mechanism 72 further includes a second collar 96 which is sized to slide within the locking collar 75. The second collar 96 has six threaded apertures 98, 98, 98, 98, 98 and 98 formed therethrough which are equally spaced apart at 60°. Even though six threaded apertures 98, 98, 98, 98, 98 and 98 are taught, any desired number of threaded apertures 98 can be used. Desirably, at least two threaded apertures 98, 98, located 180° apart, are utilized to ensure a firm attachment. A machine screw 100 is designed to be threaded into each of the six threaded apertures 98, 98, 98, 98, 98 and 98 and permanently secure the second collar 96 to the elongated barrel 12. This attachment allows the second collar 96 to be secured to the elongated barrel 12 such that both the elongated barrel 12 and the second collar 96 will rotate together.

Referring to FIGS. 9 and 10, the second collar 96 also has three threaded apertures 102, 102 and 102 formed therethrough. The three apertures 102, 102 and 102 can be equally spaced 120° apart. A threaded screw 104 is threaded into each of the three threaded apertures 102, 102 and 102. Each threaded screw 104 has an enlarged head 106 which extends outwardly from the second collar 96. Each of the three threaded screws 104, 104 and 104 is aligned with one of the first, second and third nozzles, 28, 30 and 32 or 32' positioned within the elongated barrel 12. The enlarged head 106 on each of the three outwardly extending screws 104, 104 and 104 is sized to engage with one of the three recesses 80, 80 and 80 formed in the locking collar 75. Once engaged in the three recesses 80, 80 and 80, the enlarged head 106 on each of the three threaded screws 104, 104 and 104 will hold the elongated barrel 12 stationary and in alignment with one of the first, second or third nozzles, 28, 30 and 32 or 32' respectively. For example, the first nozzle 28 and the first tube 34 can be positioned in alignment with a control mechanism 108. As the locking collar 75 is moved away from the elongated barrel 12 and towards the flange 74, the coil spring 82 is compressed. This action causes the enlarged head 106 on each of the three threaded screws 104, 104 and 104 to be separated from the three recesses 80, 80 and 80 and allows the elongated barrel 12 to rotate. The elongated barrel 12 can be rotated clockwise or counterclockwise. Clockwise rotation of the elongated barrel 12 sixty degrees (60°) will cause the second nozzle 30 to be aligned with the control mechanism 108. At this time, the locking collar 75 can be allowed to slide back to its original location under the bias of the coil spring 82. As this occurs, the three enlarged heads 106, 106 and 106 on the three threaded screws 104, 104 and 104 will again engage the three recesses 80, 80 and 80. This time, the control mechanism 108 will be aligned with the second nozzle 30. Clockwise rotation of the elongated barrel 12 one hundred and twenty degrees (120°) will cause the third nozzle 33 or 32' to be aligned with the control mechanism 108.

Alternatively, counterclockwise rotation of the elongated barrel 12 sixty degrees (60°) from its original position will cause the third nozzle 32 or 32' to be aligned with the control mechanism 108. Again, the locking collar 75 can be allowed to slide back to its original location under the bias of the coil spring 82. As this occurs, the three enlarged heads 106, 106 and 106 on the three threaded screws 104, 104 and 104 will again engage the three recesses 80, 80 and 80. This time, the control mechanism 108 will be aligned with the third nozzle 32 or 32'.

The locking collar 75 prevents the selection mechanism 72 from inadvertently rotating between the first, second and third nozzles, 28, 30 and 32 or 32' respectively.

Referring now to FIGS. 1 and 10, the control mechanism 108 will be explained in more detail. The control mechanism 108 is attached to the selection mechanism 72. The control mechanism 108 includes a fluid inlet 109 and a fluid outlet 111, see FIG. 10. The fluid inlet 109 is designed to be attached to a high pressure hose 125, see FIG. 1, for routing high pressure water and/or foam to the control mechanism 108. The fluid outlet 111 is designed to be aligned with one of the first, second or third nozzles, 28, 30 or 32 or 32' respectively. The control mechanism 108 is secured to the second end 18 of the elongated barrel 12. In FIG. 1, the control mechanism 108 is actually secured to the first collar 73. The control mechanism 108 controls the flow of high pressure water and/or foam through one of the first, second or third nozzles, 28, 30 or 32 or 32' respectively. The internal configuration of the control mechanism 108 can vary. Those skilled in the art can envision multiple ways to construct the control mechanism 108. As shown, a handle 110 is secured to the control mechanism 108. The handle 110 can vary in design and construction. The handle 110 can be made from a variety of materials. Plastic and thermoplastics are relatively inexpensive materials from which the handle 110 can be constructed.

A movable trigger 112 is mounted on the control mechanism 108. The trigger 112 can be constructed and shaped to have a uniquely shaped cam surface 114. The cam surface 114 is in constant contact with a movable pin 116. The pin 116 has a shut off valve 118, such as a ball, secured to an end thereof or which abuts an end thereof. The shut off valve 118 is biased to towards an open position by a spring 120. In the closed position, the shut off valve 118 closes off a fluid passageway 122. As the trigger 112 is moved to a second position, the cam surface 114 allows the pin 116 to move downward whereby the shut off valve 118 is urged away from the fluid passageway 122 by the spring 120. This action opens the fluid passageway 122 to fluid flow. Movement of the trigger 112 activates the flow of high pressure water and/or foam through one of the first, second or third nozzles, 28, 30 or 32 or 32' respectively.

Referring to FIGS. 1 and 10, a nut 124 is attached to a lower portion of the handle 110 and is aligned with the fluid passageway 122. One end of a light weight, pressure hose 125, see FIG. 1, can be threaded into the nut 124 such that high pressure water and/or foam can be routed to the high pressure water/foam nozzle assembly 10.

Figure 11:
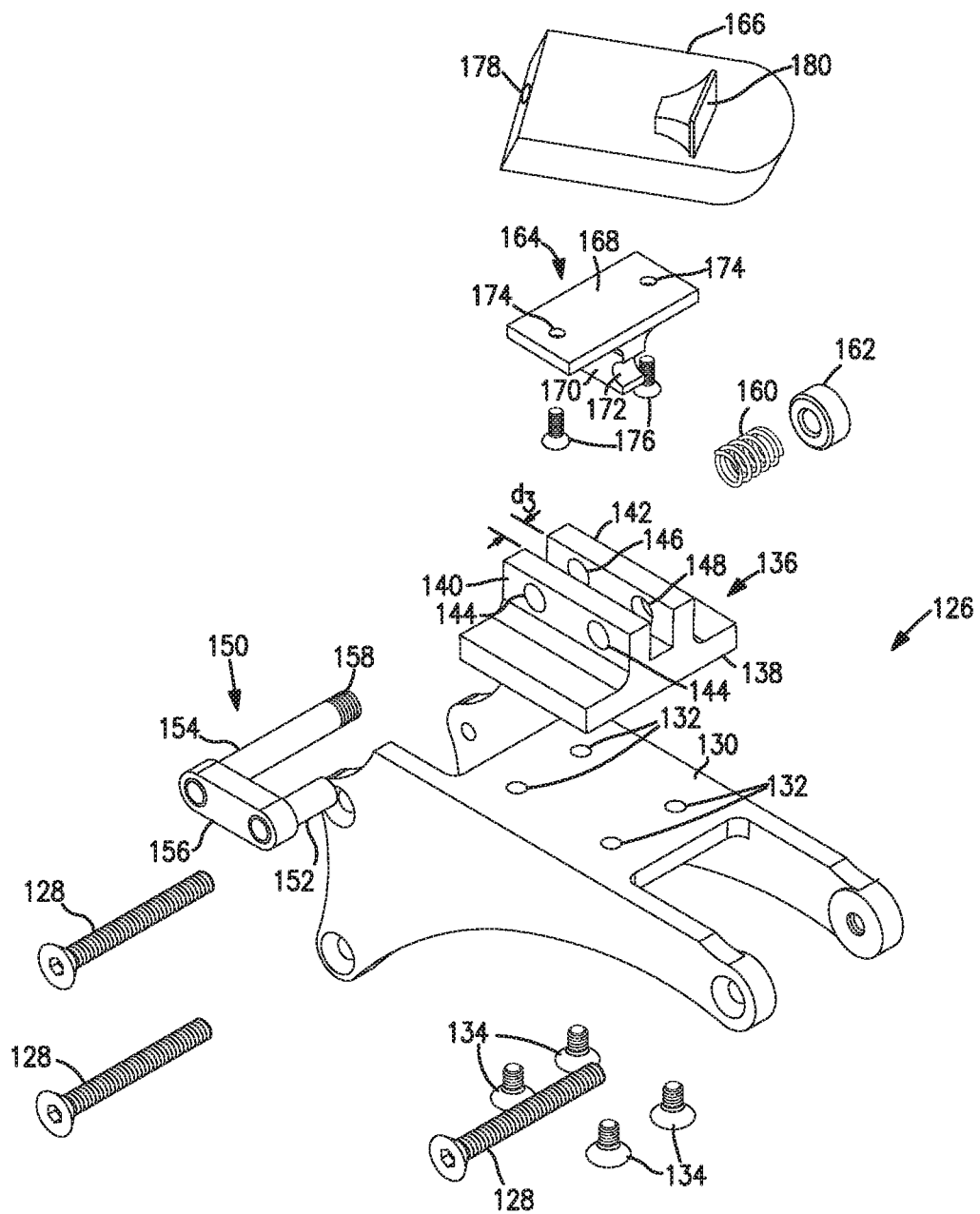
FIG. 11 is an exploded view of a mount, a first bracket, a second bracket, and an infrared camera which can be secured to the high pressure water/foam nozzle assembly.

Referring now to FIGS. 1 and 11, the high pressure water/foam nozzle assembly 10 further includes a mount 126 secured to the handle 110. The mount 126 can be secured to or above the handle 110 using one or more fasteners 128. Three fasteners 128, 128 and 128, in the form of machine screws, are shown. However, any type or kind of fasteners known to those skilled in the art can be used. The mount 126 can be formed from various materials. A metal material works fine. Other materials include: metal alloys, cast iron, aluminum, a composite material, a plastic, a thermoplastic, titanium, molybdenum, etc. The mount 126 has a top surface 130. Desirably, the top surface 130 is flat or planar.

A first bracket 136 is secured to the top surface 130 of the mount 126. The first bracket 136 can be formed from various materials. A metal material works fine. Other materials include: metal alloys, cast iron, aluminum, a composite material, a plastic, a thermoplastic, titanium, molybdenum, etc. The first bracket 136 can be formed from the same material used to construct the mount 126 or be constructed from a different material. Desirably, the first bracket 136 is formed from a metal material.

One or more apertures 132 are formed through the top surface 130 of the mount 126. Four apertures 132, 132, 132 and 132 are shown. Four screws 134, 134, 134 and 134 can pass upward through the four apertures 132, 132, 132 and 132 and engage with threaded holes (not shown) formed in a lower surface 138 of the first bracket 136.

The first bracket 136 further has a first upstanding wall 140 and a second upstanding wall 142. The first and second upstanding walls, 140, 142 respectively, are aligned parallel to one another and are spaced apart from one another by a distance $d_3$. The distance $d_3$ is at least about 0.1 inches. Desirably, the distance $d_3$ is at least about 0.15 inches. More desirably, the distance $d_3$ is at least about 0.2 inches. Even more desirably, the distance $d_3$ is at least about 0.22 inches. Most desirably, the distance $d_3$ is about 0.25 inches.

The first upstanding wall 140 has two holes 144, 144 formed horizontally there through which are spaced apart from each other on a common horizontal axis. The second upstanding wall 142 has a hole 146 formed there through, and a blind hole 148, that does not extend through the thickness of the second upstanding wall 142. The hole 146 and the blind hole 148 are spaced apart from each other on a common horizontal axis. The hole 146 is aligned with one of the two holes 144, 144 formed in the first upstanding wall 140, and the blind hole 148 is aligned with the other of the two holes 144, 144 formed in the first upstanding wall 140.

A generally U-shaped connector 150 having a first leg 152, a second leg 154 and a base member 156 is sized and configured to engage with the holes 144, 144, 146, and the blind hole 148. The first and second legs, 152 and 154 respectively, have a cylindrical configuration. The base member 156 joins the first leg 152 to the second leg 154. The base member 156 is generally flat giving the U-shaped connector 150 a flat bottom appearance. The first leg 152 is shorter in length than the second leg 154. The first leg 152 is designed to pass through one of the two holes 144, 144 formed in the first upstanding wall 140 and enter the blind hole 148 formed in the second upstanding wall 142. The second leg 154 has a threaded end 158. The second leg 154 is designed to pass through the other of the two holes 144, 144 formed in the first upstanding wall 140 and pass through the hole 146 formed in the second upstanding wall 142. A spring 160 can be positioned on the second upstanding leg 154 once it has passed through the holes 144 and 146. A nut 162 can be threaded onto the threaded end 158 to secure the generally U-shaped connector 150 to the first bracket 136.

Still referring to FIG. 11, a T-shaped bracket 164 is secured to an infrared camera 166. By "infrared" it is meant of or relating to the range of invisible radiation wavelengths from about 750 nanometers, just longer than red in the visible spectrum, to 1 millimeter, on the border of the microwave region. The T-shaped bracket 164 has a flat top member 168 and a downwardly extending member 170. The downwardly extending member 170 is aligned perpendicular to the flat top member 168. The downwardly extending member 170 has a pair of oppositely aligned, semi-circular configured notches 172, 172 formed in the opposite ends thereof. Only one of the pair of oppositely aligned, semi-circular configured notches 172, 172 is visible in FIG. 11. The pair of oppositely aligned, semi-circular configured notches 172, 172 is designed to engage with a portion of the outer circumferences of the first and second legs, 152 and 154 respectively, and secure the T-shaped bracket 164 to the first bracket 136. A pair of apertures 174, 174 is formed through the flat top member 168. A pair of screws 176, 176 can pass up through the pair of apertures 174, 174 and be threaded into a bottom surface (not shown) of the infrared camera 166 to secure the infrared camera 166 to the T-shaped bracket 164. The T-shaped bracket 164 will remain attached to the infrared camera 166 when the infrared camera 166 is removed from the first bracket 136.

The infrared camera 166 is removably secured to the control mechanism 108. The infrared camera 166 is depicted as being removably secured the first bracket 136. The infrared camera 166 is aligned parallel to the longitudinal axis X-X of the elongated barrel 12, when secured to the first bracket 136. The infrared camera 166 has one or more lenses 178 which are capable of detecting or identifying hot spots in a fire. By "lens" it is meant a ground or molded piece of glass, plastic, or other transparent material with opposite surfaces either or both of which are curved, by means of which light rays are focused to form an image. The infrared camera 166 can include a combination of two or more lenses, sometimes with other optical devices such as prisms, used to form an image for viewing or photographing. The infrared camera 166 includes a display screen 180 which exhibits a color image of the hot spots in a fire. The infrared camera 166 can be turned off when not in use to save on battery life.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A high pressure water/foam nozzle assembly comprising:
   a) a barrel having a longitudinal central axis, an external surface with a first end and a second end, a collar positioned about said first end which protrudes outward from said external surface;
   b) a first nozzle, a second nozzle and a third nozzle all radially aligned around said longitudinal central axis, and each of said first, second and third nozzles emitting a different spray pattern;
   c) a selection mechanism positioned adjacent to said second end of said barrel, said selection mechanism rotatable between a first position, a second position, and a third position, said first position aligned with said first nozzle, said second position aligned with said second nozzle, and said third position aligned with said third nozzle, and said selection mechanism including a locking collar for preventing said selection mechanism from inadvertently rotating;
   d) a control mechanism attached to said selection mechanism for controlling the flow of high pressure water and/or foam through one of said first, second or third nozzles;
   e) a handle secured to said control mechanism;
   f) a trigger is mounted to said control mechanism for activating the flow of high pressure water and/or foam through one of said first, second or third nozzles;
   g) a mount secured to said control mechanism;
   h) a first bracket secured to said mount; and
   i) an infrared camera secured to said first bracket and aligned parallel to said longitudinal axis of said barrel for detecting hot spots in a fire.

2. The high pressure nozzle assembly of claim 1 wherein said barrel is constructed of stainless steel, and a knurled portion is formed on said external surface which extends rearward from said collar, said knurled portion having a length which allows a person to grasp said barrel with one hand and point said barrel in a desired direction.

3. The high pressure nozzle assembly of claim 1 wherein water and/or foam can be dispensed from said first, second or third nozzles at a flow rate ranging from between about 6 gallons per minute to about 20 gallons per minute, and at a pressure ranging from between about 1,500 psi. to about 3,000 psi.

4. The high pressure nozzle assembly of claim 1 wherein said collar comprises a first end, a second end, a length and a height, said first end of said collar is coextensive with said first end of said barrel, said length is at least about 0.5 inches, said height is at least about 0.15 inches measured from said external surface of said barrel, and said collar serves as a stop to prevent a person's hand from sliding off of said barrel.

5. The high pressure nozzle assembly of claim 4 wherein said collar is integral with said barrel.

6. The high pressure nozzle assembly of claim 1 wherein said first nozzle comprises a first tube having a first opening and a second opening, and said first opening is aligned flush with said first end of said barrel, said second nozzle comprises a second tube having a first opening and a second opening, and said first opening of said second tube is spaced inward from said first end of said barrel, and said third nozzle comprises a third tube having a first opening and a second opening, and said first opening of said third tube is spaced inward from said first end of said barrel.

7. The high pressure nozzle assembly of claim 6 wherein each of said first and second tubes has a circular profile, said third tube has a non-circular profile.

8. The high pressure nozzle assembly of claim 1 further comprising a first fitting and a second fitting, said first, second and third nozzles being secured to said first fitting, said first fitting being secured to said second fitting and said second fitting being secured to said second end of said barrel, and each of said first, second and third nozzles can emit high pressure water and/or foam droplets having a length of at least about 40 μm.

9. The high pressure nozzle assembly of claim 1 wherein said different spray patterns include a straight stream of water or wet foam, a conical stream of water or wet foam, and a highly aspirated stream of water and foam.

10. A high pressure water/foam nozzle assembly comprising:
   a) a barrel having a longitudinal central axis, an external surface with a first end and a second end, a collar positioned about said first end which protrudes outward from said external surface, and said external surface having a knurled portion formed thereon which extends rearward from said collar;
   b) a first nozzle, a second nozzle and a third nozzle all radially aligned around said longitudinal central axis, and each of said first, second and third nozzles emitting a different spray pattern;
   c) a selection mechanism positioned adjacent to said second end of said barrel, said selection mechanism rotatable between a first position, a second position, and a third position, said first position aligned with said first nozzle, said second position aligned with said second nozzle, and said third position aligned with said third nozzle, and said selection mechanism including a locking collar for preventing said selection mechanism from inadvertently rotating;
   d) a control mechanism secured to said selection mechanism for controlling the flow of high pressure water and/or foam through one of said first, second or third nozzles;
   e) a handle secured to said control mechanism;
   f) a movable trigger mounted on said control mechanism which can activate the flow of high pressure water and/or foam through one of said first, second or third nozzles;
   g) a mount secured to said control mechanism;
   h) a first bracket secured to said mount; and
   i) an infrared camera removably secured to said first bracket and aligned parallel to said longitudinal axis of said barrel for detecting hot spots in a fire.

11. The high pressure nozzle assembly of claim 10 wherein said selection mechanism comprises a first collar having an outward extending flange, a locking collar having a first end and a second end and which is sized to axially slide on a portion of said first collar, said locking collar having at least one axial slot formed between said first and second ends, said locking collar further having three space apart recesses which open at said first end, a coil spring position on said first collar, said coil spring having a first end which contacts said flange of said first collar and a second end which contacts said second end of said locking collar, said coil spring biasing said locking collar away from said flange, a screw secured to said first collar which engages with said at least one axial slot formed in said locking collar to prevent said locking collar from rotating, and a second collar permanently secured to said second end of said barrel which is sized to slide within said locking collar, said second collar having three outwardly extending members aligned with one of said first, second and third nozzles positioned within said barrel and each of said three outwardly extending members designed to engage with one of said three recesses formed in said locking collar, such that said barrel can be rotated to align one of said first, second or third nozzles with said control mechanism.

12. The high pressure nozzle assembly of claim 10 wherein said control mechanism comprises a fluid inlet and a fluid outlet, said fluid inlet is designed to be attached to a high pressure hose for routing high pressure water and/or foam to said control mechanism, and said fluid outlet is designed to be aligned with one of said first, second or third nozzles by rotating said barrel and using said locking collar to lock said first, second or third nozzles into alignment with said fluid outlet.

13. The high pressure nozzle assembly of claim 10 wherein water and/or foam can be dispensed from said first, second or third nozzles at a flow rate ranging from between about 6 gallons per minute to about 20 gallons per minute, and at a pressure ranging from between about 1,500 psi. to about 3,000 psi.

14. The high pressure nozzle assembly of claim 10 further comprising a first fitting and a second fitting, said first fitting containing three bores formed there through with a seal positioned in each of said three bores, each said first, second and third nozzles being secured to said first fitting, said first fitting being secured to said second fitting, and said second fitting being secured to said second end of said barrel.

15. The high pressure nozzle assembly of claim 10 wherein said infrared camera comprises a display screen which exhibits a color image of the hot spots in a fire.

16. A high pressure water/foam nozzle assembly comprising:
   a) a barrel having a longitudinal central axis, an external surface with a first end and a second end, a collar positioned about said first end which protrudes outward from said external surface, and said external surface having a knurled portion formed thereon which extends rearward from said collar;
   b) a first nozzle, a second nozzle and a third nozzle all radially aligned around said longitudinal central axis, and each of said first, second and third nozzles emitting a different spray pattern;
   c) a selection mechanism positioned adjacent to said second end of said barrel, said selection mechanism rotatable between a first position, a second position, and a third position, said first position aligned with said first nozzle, said second position aligned with said second nozzle, and said third position aligned with said third nozzle, and said selection mechanism including a locking collar for preventing said selection mechanism from inadvertently rotating;
   d) a control mechanism secured to said selection mechanism for controlling the flow of high pressure water and/or foam through one of said first, second or third nozzles;
   e) a handle secured to said control mechanism;
   f) a movable trigger is mounted on said control mechanism which can activate the flow of high pressure water and/or foam through one of said first, second or third nozzles;
   g) a mount secured to said control mechanism, said mount having a top surface;
   h) a first bracket secured to said top surface of said mount; and
   i) an infrared camera removably secured to said first bracket and aligned parallel to said longitudinal axis of said barrel for detecting hot spots in a fire.

17. The high pressure nozzle assembly of claim 16 wherein said selection mechanism comprises a first collar having an outward extending flange, a locking collar having a first end and a second end and sized to axially slide on a portion of said first collar, said locking collar having at least one axial slot formed between said first and second ends, said locking collar further having three space apart recesses which open at said first end, a coil spring position on said first collar, said coil spring having a first end which contacts said flange of said first collar and a second end which contacts said second end of said locking collar, said coil spring biasing said locking collar away from said flange, a screw secured to said first collar which engages with said at least one axial slot formed in said locking collar to prevent said locking collar from rotating, and a second collar permanently secured to said barrel which is sized to slide within said locking collar, said second collar having three outwardly extending members aligned with one of said first, second and third nozzles positioned within said barrel and each of said three outwardly extending members designed to engage with one of said three recesses formed in said locking collar, such that said barrel can be rotated to align one of said first, second or third nozzles with said control mechanism.

18. The high pressure nozzle assembly of claim 16 wherein said control mechanism comprises a fluid inlet and a fluid outlet, said fluid inlet is designed to be attached to a high pressure hose for routing high pressure water and/or foam to said control mechanism, and said fluid outlet designed to be aligned with one of said first, second or third nozzles by rotating said barrel and using said locking collar to lock said first, second or third nozzles into alignment with said fluid outlet.

19. The high pressure nozzle assembly of claim 16 wherein each of said first, second and third nozzles can emit high pressure water and/or foam droplets having a length of at least about 40 μm.

20. The high pressure nozzle assembly of claim 16 further comprising a first fitting and a second fitting, said first fitting containing three bores formed there through with a seal positioned in each of said three bores, each said first, second and third nozzles being secured to said first fitting, said first fitting being secured to said second fitting, and said second fitting being secured to said second end of said barrel.

* * * * *